US006646865B2

United States Patent
Huang et al.

(10) Patent No.: US 6,646,865 B2
(45) Date of Patent: Nov. 11, 2003

(54) PORTABLE COMPUTER AND STRUCTURAL FRAME THEREOF

(75) Inventors: Chun-Wei Huang, Taipei Hsien (TW); Yi-Chang Yeh, Taipei Hsien (TW); Yung-Hung Chih, Taipei Hsien (TW)

(73) Assignees: Wistron Corp., Taipei Hsien (TW); Acer Inc., Taipei Hsien (TW)

( * ) Notice: Subject to any disclaimer, the term of this patent is extended or adjusted under 35 U.S.C. 154(b) by 77 days.

(21) Appl. No.: 10/052,378

(22) Filed: Jan. 23, 2002

(65) Prior Publication Data

US 2003/0007323 A1 Jan. 9, 2003

(30) Foreign Application Priority Data

Jul. 9, 2001 (TW) ...................................... 90211516 U

(51) Int. Cl.[7] ................................................ G06F 1/16
(52) U.S. Cl. ...................... 361/683; 361/818; 361/681; 312/223.2; 395/156
(58) Field of Search ........................ 361/683, 681–682, 361/684–687, 725, 816, 818, 724, 727, 797, 730, 712–720; 312/223.1, 223.2, 223.3; 174/138 G, 35 R; 395/156, 168, 905

(56) References Cited

U.S. PATENT DOCUMENTS

| 5,237,486 | A | * | 8/1993 | LaPointe et al. | ............. 361/681 |
| 5,715,139 | A | * | 2/1998 | Nakajima | .................... 361/683 |
| 5,973,920 | A | * | 10/1999 | Altic et al. | ................... 361/687 |
| 6,101,088 | A | * | 8/2000 | Nakajima et al. | ............ 361/686 |
| 6,347,044 | B1 | * | 2/2002 | Won et al. | .................... 361/807 |
| 6,504,711 | B2 | * | 1/2003 | Wu et al. | ..................... 361/687 |

* cited by examiner

Primary Examiner—Michael Datskovsky
(74) Attorney, Agent, or Firm—Nixon Peabody LLP; Donald R. Studebaker

(57) ABSTRACT

The present invention generally relates a portable computer, more particularly, to a structural frame for a portable computer. The frame includes a body, at least one hinge supporter, an input and output (I/O) port bracket, and a channel. The hinge supporter supports a display panel of the portable computer. The I/O port bracket accommodates a plurality of I/O terminals. The channel guides a liquid unexpectedly appearing on the body to a predetermined location. The frame is preferable made of a metal material for shielding and absorbing electromagnetic interference (EMI) and for strengthening the structure of the portable computer. The frame further contacts a heat-generating electronic device to dissipate the heat generated therefrom.

26 Claims, 3 Drawing Sheets

PORTABLE COMPUTER AND STRUCTURAL FRAME THEREOF

BACKGROUND OF THE INVENTION

1. Field of the Invention

The present invention generally relates to a portable computer, and more particularly, to a structural frame for a portable computer.

2. Description of the Prior Art

A portable computer typically includes two major parts, a display panel and a main body. The main body usually includes a housing consisting of an upper case and a lower case. The upper case includes a space for accommodating a keyboard unit. Other devices, such as logic boards, a hard disc drive, a floppy disc drive, etc., are disposed inside the housing. The upper case and the lower case are fastened together to form the housing. The display panel is connected to one or more hinge supporters provided in the housing. The display panel and the main body can therefore be folded into a close position as one easy-carry unit.

Materials such as reinforced plastic or composite material are typically used to form the housing of the portable computer. Other components, including logic board and hard disc drive/floppy disc drive, are affixed by screws or other fastening devices on the upper case or the lower case. In the state-of-art technology, the hard disc drive and the floppy disc drive are detachably disposed inside the main body. That is, the hard disc drive and the floppy disc drive are not affixed on the lower case. Therefore, the user can conveniently install the hard disc drive, the floppy disc drive, or CD-ROM according to his/her need. Inner walls of the upper case and the lower case are usually coated with conductive paints or covered with shielding materials to shield the electromagnetic interference (EMI).

However, there is still room for improvement over the prior art. Firstly, the reinforced plastic or composite material does not provide the portable computer with sufficient strength. However, to replace the reinforced plastic or composite material with metal materials does not respond to the commercial needs due to the increase in cost and weight of the portable computer. Secondly, coating conductive paints or covering shielding materials on the inner walls of the upper and lower cases not only increases the manufacturing cost, but also induces environmental problems when the upper and lower cases are recycled.

In view of the prior art described, there is a need to provide a portable computer and a structural frame for shielding and absorbing the electromagnetic interference and for strengthening the structure of a portable computer. There is a further need to provide an inner structural frame with heat dissipating and liquid draining functions for a portable computer.

SUMMARY OF THE INVENTION

The frame according to the present invention, which is disposed between an upper case and a lower case of a portable computer having a display panel and a printed circuit board, includes a body, at least one hinge supporter, an input and output (I/O) port bracket, and a channel. The hinge supporter is connected to the body for supporting the display panel. The I/O port bracket is connected to the body for accommodating a plurality of I/O terminals. The channel formed in the body guides a liquid unexpectedly appearing on the body.

The frame of the present invention is preferably made of a metal material for shielding and absorbing electromagnetic interference (EMI) and for strengthening the structure of the portable computer. Additionally, the body includes at least one heat conductive portion. The heat conductive portion contacts a heat-generating electronic device in the portable computer to dissipate the heat generated therefrom. The frame further includes an opening and a movable metal portion. The movable metal portion is detachably connected to the body and substantially covers the opening. The movable metal portion serves to shield and absorb electromagnetic interference. The implement of the movable metal portion also has the advantage of readily accessing circuit boards inside the portable computer for replacement of electronic components.

The portable computer according to the present invention includes a display panel, an upper case, a lower case, a printed circuit board, and the above-mentioned frame. The display panel displays data. The upper case and the lower cases are mated with each other to form a housing of the computer. The upper case accommodates a keyboard unit. The keyboard unit has a base plate provided with a plurality of holes. The channel of the frame corresponds to locations of the holes in the base plate. When a liquid is unexpectedly dropped on the keyboard unit, the liquids may thereby leak through the holes to the channel and further flow along the channel to leak out of the portable computer through holes provided on the lower case.

The frame absorbs and shields electromagnetic interference and also serves to dissipate heat. The implement of the frame has advantages of strengthening structure of the portable computer, supporting the display panel, and accommodating I/O terminals. Furthermore, the frame also provides a liquid draining feature to tackle problems of the prior art.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Embodiments of the invention will now be described in detail.

Figure 1:
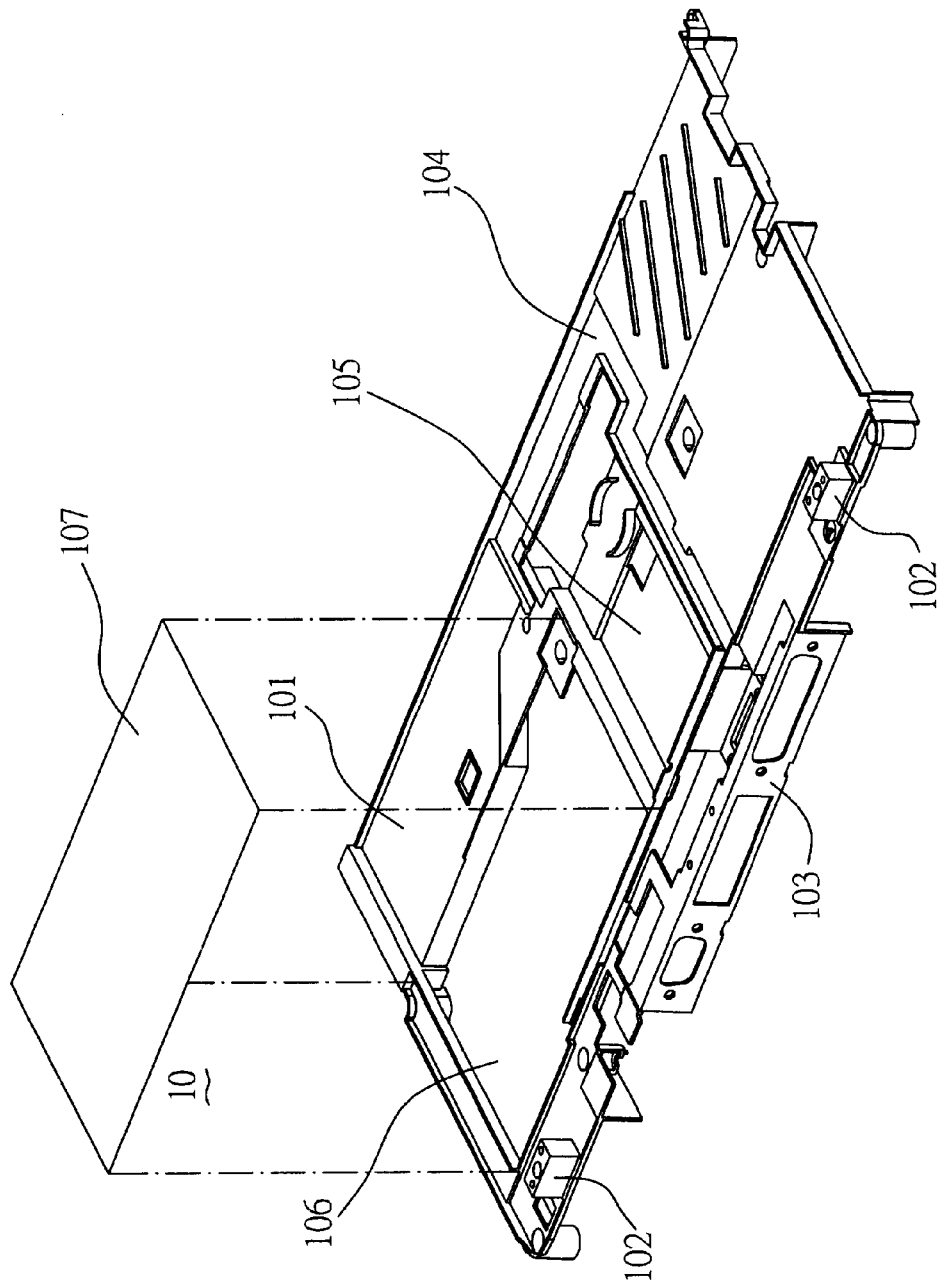
FIG. 1 is a three-dimensional view of the structural frame according to a preferred embodiment of the present invention.

Referring to FIG. 1, in accordance with the present invention, a three-dimensional view of a structural frame 10 for a portable computer according to the preferred embodiment is illustrated. The portable computer includes a display panel and a main body. The frame 10 is disposed between an upper case and a lower case of the main body of the portable computer. The frame 10 includes a body 101, at least one hinge supporter 102, an input and output (I/O) port bracket 103, and a channel 104. The hinge supporter 102 and the I/O port bracket 103 are connected to the body 101 respectively. The channel 104 is formed in the body 101. The hinge supporter 102 is provided on one side of the body 101 for supporting the display panel of the portable computer, so that the display panel can be pivoted relative to the main body. The I/O port bracket 103 is connected to the rear edge of the body 101 for accommodating a plurality of I/O terminals. The frame 10 is preferably made of a metal material, such that the frame 10 shields and absorbs electromagnetic interference and strengthens structure of the portable computer. The metal material is preferable a magnesium-aluminum alloy to achieve a better strength-to-weight ratio. Moreover, the frame 10 is preferable an injection molded frame.

The frame 10 further includes at least one heat conductive portion 105. The level of the heat conductive portion 105 is slightly lower than other portions of the frame 10. Therefore, the heat conductive portion 105 directly contacts a heat-generating electronic device mounted on the circuit board under the frame 10 to dissipate heat generated therefrom. Examples of such heat-generating electronic device are south bridge chip, north bridge chip, and CPU, etc.

The frame 10 may further includes an opening 106 and a movable metal portion 107. The movable metal portion 107 is detachably connected to the body 101 and substantially covers the opening 106. The movable metal portion 107 serves to shield and absorb electromagnetic interference. The implement of the movable metal portion 107 also has the advantage of readily accessing circuit boards inside the portable computer for replacement of electronic components, for example, CPU or fan. The movable metal portion 107 is connected to the body 101 by means of connecting devices such as leaf springs and screws. The movable metal portion 107 is preferably a metal plate made of aluminum.

The channel 104 provided in the body 101 guides a liquid unexpectedly dropped on the body 101 to prevent the liquid from falling onto the underlying printed circuit board or other electronic devices. The channel 104 also guides the liquid along a predetermined path out of the main body of the portable computer. The channel 104 of this embodiment is designed to permit a liquid volume of about 350 cc. being guided out of the portable computer at a time. In other words, when a liquid is unexpectedly dropped on the portable computer, the frame 10 of the present invention prevents damage to devices of the portable computer by the liquid.

Figure 2:
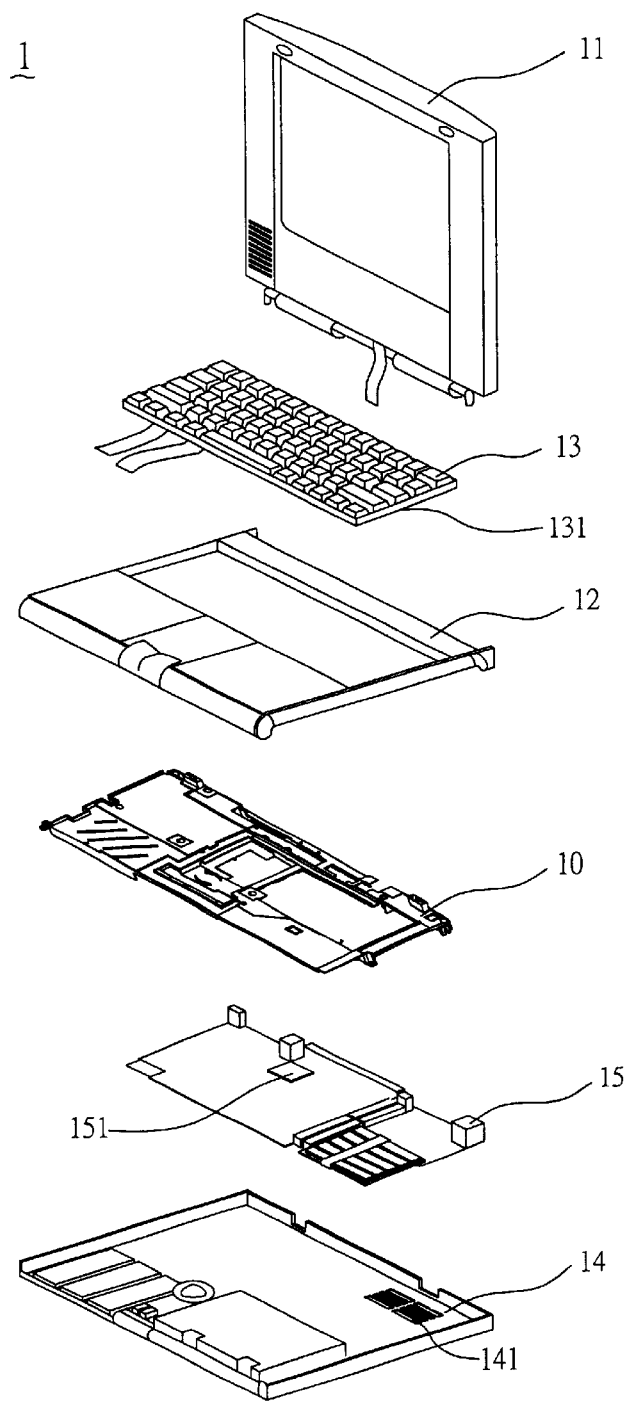
FIG. 2 is an exploded view of a portable computer with a structural frame of the present invention.

Referring to FIG. 2, in accordance with the present invention, an exploded view of a portable computer 1 with the structural frame 10 is illustrated. The portable computer 1 includes a display panel 11, an upper case 12, a keyboard unit 13, a lower case 14, a printed circuit board 15, and the frame 10. As above-mentioned, the frame 10 includes at least one hinge supporter for supporting the display panel 11. Therefore, the display panel 11 can be pivotaly folded on the main body of the portable computer 1 as one easy-carry unit. The upper case 12 has a space for accommodating the keyboard unit 13. The lower case 14 and the upper case 12 are fastened with each other to form a housing of the computer. The printed circuit board 15 is disposed in the housing. The frame 10 is preferably disposed between the upper case 12 and the printed circuit board 15.

As shown in FIG. 2, the frame 10 substantially covers the underlying electronic components on the printed circuit board 15. Therefore, the electromagnetic interference is shielded and absorbed by the frame 10. A heat-generating electronic device 151, such as a south bridge chip, a north bridge chip, and a CPU, is mounted on the printed circuit board 15. As described above, the frame 10 has at least one heat conductive portion 105 (see FIG. 1). The level of the heat conductive portion 105 is lower than other portions of the frame 10 so that the heat conductive portion 105 may directly contact the heat-generating electronic device 151 under the frame 10 to dissipate the heat generated therefrom.

Figure 3:
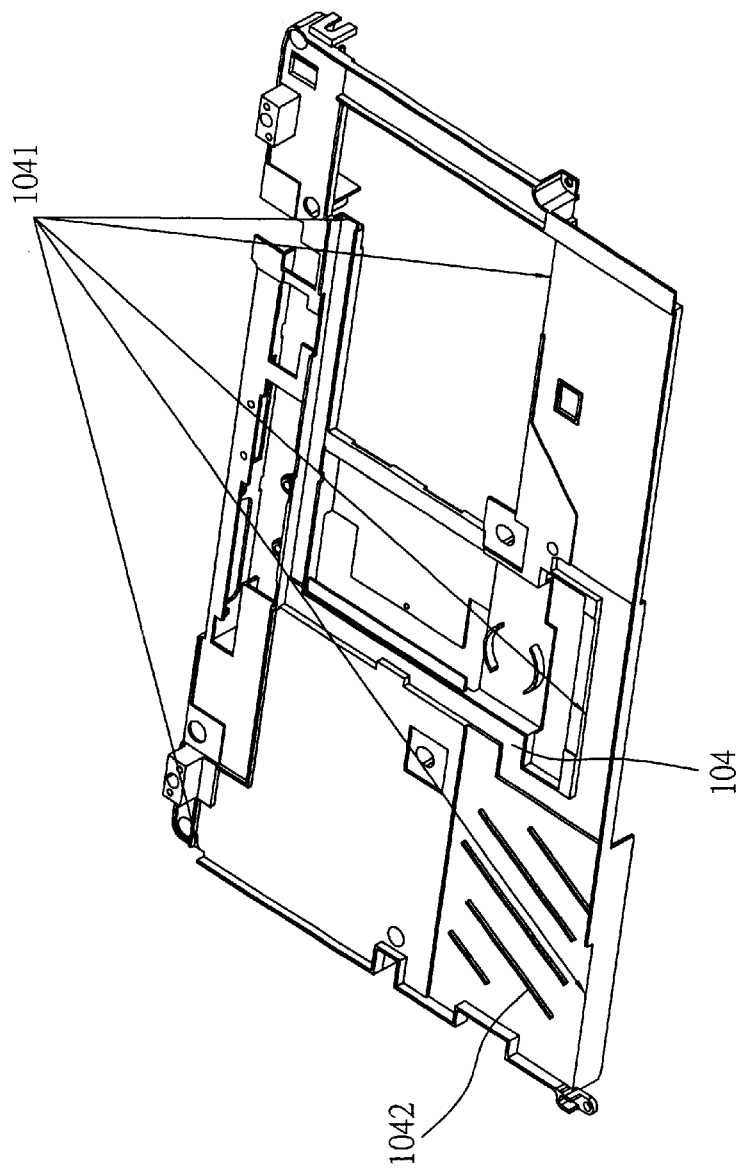
FIG. 3 is a schematic view illustrating the liquid draining design of the frame according to the invention.

FIG. 3 is a schematic view illustrating the liquid draining design of the frame 10 according to the invention. The frame 10 is provided with one or more liquid outlets 1041 in addition to the channel 104. As shown in FIG. 3, these liquid outlets 1041 are arranged on locations where the printed circuit board 15 is dodged. Due to such design, the liquid unexpectedly dropped on the body 101 of the frame 10 is guided along the channel 104 and drained away through the liquid outlets 1041 to the lower case 14. Therefore, the printed circuit board or other electronic devices is safe from the liquid. Moreover, one or more holes 141 (refer to FIG. 2) can be provided on the lower case 14 for the liquid to leak out of the portable computer therethrough. Additionally, a plurality of liquid guiding ribs 1042 are optionally disposed on the body 101 for guiding the liquid to the liquid outlet 1041.

The keyboard unit 13 shown in FIG. 2 includes a base plate 131 provided with a plurality of holes (not shown). The holes in the base plate 131 correspond to the channel 104 or/and the liquid outlet 1041 of the frame 10. When liquid is unexpectedly dropped on the keyboard unit 13 of the portable computer 1, the liquid falls to the frame 10 through the holes in the base plate 131 and is then guided to a predetermined location by the channel 104, the liquid guiding ribs 1042, and the liquid outlet 1041.

In the prior art, inner walls of the upper case and the lower case are usually coated with conductive paints or covered with shielding materials for the purpose of electromagnetic interference shielding. The metal frame of the present invention substitutes for the conventional electromagnetic shielding technique, resulting in cost reduction and environmental protection. Moreover, the heat conductive portion preferably directly contacts the heat-generating electronic device for providing the function of heat dissipation. Under the prerequisite of increasing least weight to the portable computer, the frame of the present invention is implemented to strengthen structure of a portable computer and to support the keyboard. The frame also has the hinge supporter for supporting the display panel and the I/O port bracket for accommodating the I/O terminals, which leads to the reduction of cost and number of components, and simplification of assembly process. More importantly, the frame has the channel to guide the liquid, which prevents damage to the portable computer and eliminates the drawback of the prior art.

The frame of the present invention is preferably made of a magnesium-aluminum alloy. However, any other material is still in the scope of the present invention. Additionally, the frame preferably includes an opening and a movable metal portion to conveniently replace CPU, hard disc drive, floppy disc drive, CD-ROM or battery. However, an integral frame is till in the scope of the present invention.

Although specific embodiments have been illustrated and described, it will be obvious to those skilled in the art that various modifications may be made without departing from what is intended to be limited solely by the appended claims.

What is claimed is:

1. A frame for disposal between an upper case and a lower case of a portable computer, said portable computer including a display panel and a printed circuit board, said frame comprising:

a body;

at least one hinge supporter, connected to said body, for supporting said display panel;

an input and output (I/O) port bracket, connected to said body, for accommodating a plurality of I/O terminals; and a channel, formed in said body, for guiding a liquid unexpectedly appearing on said body.

2. The frame according to claim 1, wherein said frame is made of a metal material for shielding and absorbing electromagnetic interference (EMI) and strengthening the structure of said portable computer.

3. The frame according to claim 2, wherein said body comprises at least one heat conductive portion for contact with a heat-generating electronic device in said portable computer to dissipate the heat generated therefrom.

4. The frame according to claim 2, wherein said metal material is a magnesium-aluminum alloy.

5. The frame according to claim 1, wherein said channel corresponds to locations of a plurality of holes provided in a keyboard unit of said portable computer for said liquid to leak through said holes to said channel.

6. The frame according to claim 1, wherein said lower case is provided with a plurality of holes corresponding to said channel for said liquid to leak out of said lower case.

7. The frame according to claim 1, wherein said frame is disposed between said upper case and said printed circuit board (PCB).

8. The frame according to claim 1, wherein said frame is an injection molded frame.

9. The frame according to claim 1, wherein said frame comprises an opening and a movable metal portion, said movable metal portion being detachably connected to said body and substantially covers said opening.

10. The frame according to claim 9, wherein said movable metal portion is an aluminum plate.

11. A metal frame for disposal between an upper case and a lower case of a portable computer, said portable computer including a display panel and a printed circuit board, said metal frame comprising:

a body substantially covering said printed circuit board of said portable computer, for shielding and absorbing electromagnetic interference and strengthening structure of said portable computer;

at least one hinge supporter, connected to said body, for supporting said display panel;

an input and output (I/O) port bracket, connected to said body, for accommodating a plurality of I/O terminals;

a channel, formed in said body, for guiding a liquid unexpectedly appearing on said body; and an outlet, disposed on said body, for guiding said liquid to said lower case, avoiding wetting of the printed circuit board.

12. The metal frame according to claim 11, wherein said body comprises at least a heat conductive portion for contact with a heat-generating electronic device on said printed circuit board to dissipate the heat generated therefrom.

13. The metal frame according to claim 11, wherein said body comprises an opening and a movable metal portion, said movable metal portion being detachably connected to said body and substantially covers said opening.

14. The metal frame according to claim 13, wherein said movable metal portion is an aluminum plate.

15. The metal frame according to claim 11, wherein said metal frame is made of a magnesium-aluminum alloy.

16. The metal frame according to claim 11, wherein said channel corresponds to locations of a plurality of holes in a keyboard unit of said portable computer for said liquid to leak through said holes to said channel.

17. The metal frame according to claim 11, wherein said lower case is provided with a plurality of holes corresponding to said channel for said liquid to leak out of said lower case.

18. The metal frame according to claim 11, wherein said metal frame is an injection molded frame.

19. A portable computer comprising:

a display panel for displaying data;

an upper case for accommodating a keyboard unit, said keyboard unit having a base plate provided with a plurality of holes;

a lower case combined with said upper case to form a housing of said computer;

a printed circuit board disposed inside said housing, said printed circuit board having a heat-generating electronic device mounted thereon; and a frame, disposed between said upper case and said printed circuit board, for strengthening the structure of said portable computer, wherein said frame comprises:

a body;

at least one hinge supporter, connected to said body, for supporting said display panel;

an input and output (I/O) port bracket, connected to said body, for accommodating a plurality of I/O terminals; and a channel, formed in said body, for guiding a liquid unexpectedly appearing on said body.

20. The portable computer according to claim 19, wherein said frame is made of a metal material for absorbing and shielding electromagnetic interference.

21. The portable computer according to claim 20, wherein said body comprises at least one heat conductive portion for contact with said heat-generating electronic device to dissipate the heat generated therefrom.

22. The portable computer according to claim 20, wherein said metal material is a magnesium-aluminum alloy.

23. The portable computer according to claim 19, wherein said channel corresponds to locations of said holes in said base plate for said liquid to leak through said holes to said channel.

24. The portable computer according to claim 19, wherein said lower case is provided with a plurality of holes corresponding to said channel for said liquid to leak out of said lower case.

25. The portable computer according to claim 19, wherein said frame is an injection molded frame.

26. The portable computer according to claim 20, wherein said frame comprises an opening and a movable metal portion, said movable metal portion being detachably connected to said body and substantially covers said opening.

* * * * *